(12) United States Patent
Tomioka

(10) Patent No.: US 12,056,403 B2
(45) Date of Patent: Aug. 6, 2024

(54) IMAGE PROCESSING APPARATUS, IMAGE FORMING SYSTEM, AND RECORDING MEDIUM FOR FORMING AN IMAGE QUALITY ADJUSTMENT PATCH AT A PREDETERMINED CYCLE

(71) Applicant: KONICA MINOLTA, INC., Tokyo (JP)

(72) Inventor: Eigo Tomioka, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/220,304

(22) Filed: Jul. 11, 2023

(65) Prior Publication Data
US 2024/0078060 A1  Mar. 7, 2024

(30) Foreign Application Priority Data
Sep. 1, 2022  (JP) ................... 2022-138885

(51) Int. Cl.
*G06F 3/12*  (2006.01)
*G06K 15/02*  (2006.01)

(52) U.S. Cl.
CPC .......... *G06F 3/1208* (2013.01); *G06F 3/1251* (2013.01); *G06K 15/1823* (2013.01)

(58) Field of Classification Search
CPC .. G06F 3/1208; G06F 3/1251; G06K 15/1823

USPC ......................................... 358/1.9
See application file for complete search history.

(56) References Cited

U.S. PATENT DOCUMENTS

| | | | | |
|---|---|---|---|---|
| 8,078,070 B2 * | 12/2011 | Kubo | ............... | G03G 15/5041 |
| | | | | 399/49 |
| 8,797,600 B2 * | 8/2014 | Harashima | ............... | H04N 1/60 |
| | | | | 382/175 |
| 9,164,414 B2 * | 10/2015 | Murakami | ............... | G03G 15/5058 |
| 2004/0130737 A1 * | 7/2004 | Kamimura | ............... | H04N 1/58 |
| | | | | 358/1.9 |
| 2007/0041028 A1 * | 2/2007 | Seko | ............... | H04N 1/6058 |
| | | | | 358/1.9 |
| 2012/0206746 A1 * | 8/2012 | Sakatani | ............... | H04N 1/00015 |
| | | | | 358/1.9 |
| 2016/0210540 A1 * | 7/2016 | Tanaka | ............... | G06K 15/1805 |

FOREIGN PATENT DOCUMENTS

JP  2010197586 A  9/2010

* cited by examiner

*Primary Examiner* — Allen H Nguyen
(74) *Attorney, Agent, or Firm* — Holtz, Holtz & Volek PC

(57) ABSTRACT

An image processing apparatus includes a hardware processor that generates an image based on print data of a print job and print image data for forming an image quality adjustment patch at a predetermined cycle and executes replacement processing for replacing a predetermined image with the image quality adjustment patch based on an image quality state of an output product or a state of an image former.

20 Claims, 17 Drawing Sheets

← PAPER TRANSPORT DIRECTION

FIG.12
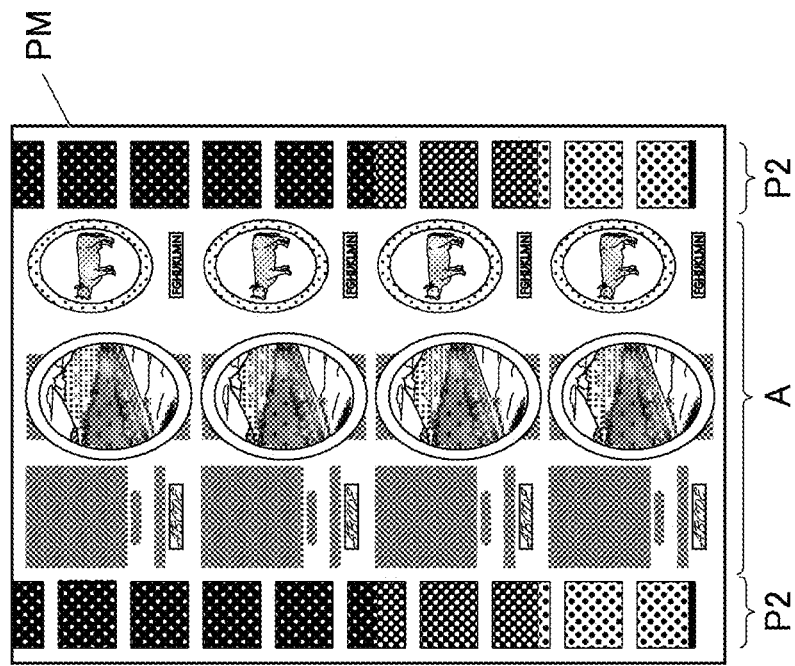
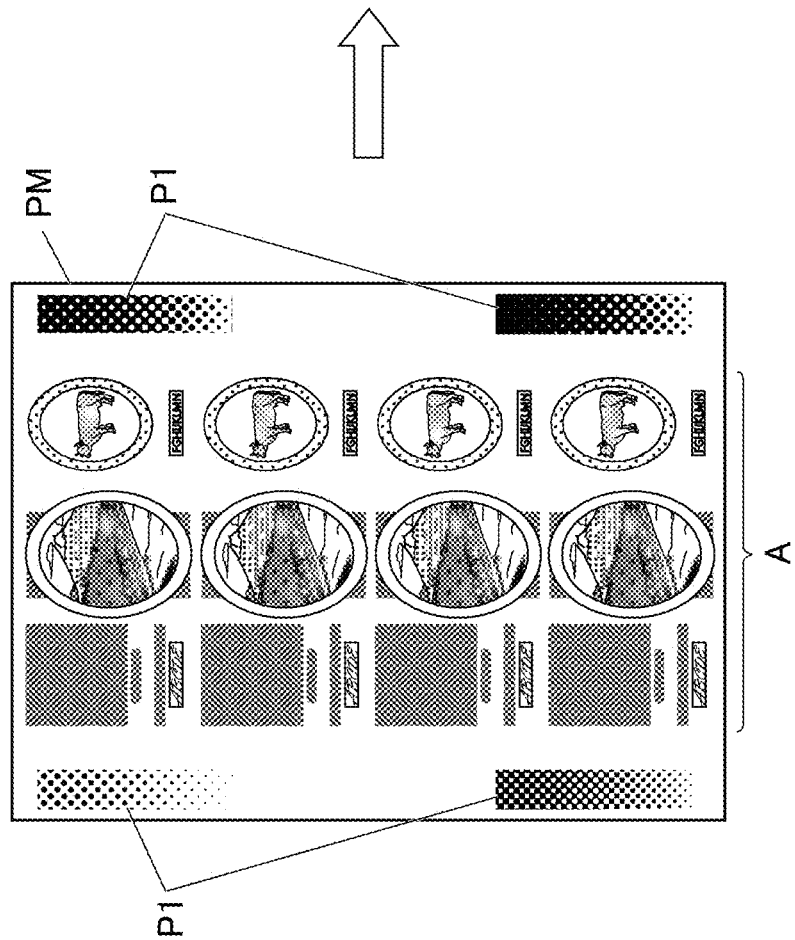

IMAGE PROCESSING APPARATUS, IMAGE FORMING SYSTEM, AND RECORDING MEDIUM FOR FORMING AN IMAGE QUALITY ADJUSTMENT PATCH AT A PREDETERMINED CYCLE

CROSS-REFERENCE TO RELATED APPLICATIONS

The entire disclosure of Japanese Patent Application No. 2022-138885 filed on Sep. 1, 2022 is incorporated herein by reference in its entirety.

TECHNICAL FIELD

The present invention relates to an image processing apparatus, an image forming system, and a recording medium.

DESCRIPTION OF THE RELATED ART

In a known image forming apparatus, image quality adjustment patches such as a gradation correction patch and a coverage rate correction patch are formed on paper to adjust the image quality of a formed image.

For example, JP 2010-197586 A discloses that a toner ejection pattern (coverage rate correction patch) and a calibration patch (gradation connection patch) are simultaneously formed at the timing of executing toner ejection.

SUMMARY OF THE INVENTION

However, in the invention disclosed in JP 2010-197586 A, a predetermined image quality adjustment patch is formed at a determined location. For this reason, depending on the job content or the state of the image former, it is not always possible to form an appropriate image adjustment patch at the required timing.

It is an object of the present invention to provide an image processing apparatus, an image forming system, and a recording medium that allows an image quality adjustment patch to be more appropriately formed.

To achieve at least one of the abovementioned objects, according to an aspect of the present invention, an image processing apparatus reflecting one aspect of the present invention includes: a hardware processor that generates an image based on print data of a print job and print image data for forming an image quality adjustment patch at a predetermined cycle and executes replacement processing for replacing a predetermined image with the image quality adjustment patch based on an image quality state of an output product or a state of an image former.

To achieve at least one of the abovementioned objects, according to an aspect of the present invention, a recording medium reflecting one aspect of the present invention is a non-transitory computer-readable recording medium storing a program causing a computer of an image processing apparatus to perform: generating an image based on print data of a print job and print image data for forming an image quality adjustment patch at a predetermined cycle; and executing replacement processing for replacing a predetermined image with the image quality adjustment patch based on an image quality state of an output product or a state of an image former.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 12 is a diagram showing an example of replacing a gradation correction patch with a coverage rate correction patch;

DETAILED DESCRIPTION

Hereinafter, one or more embodiments of the present invention will be described with reference to the drawings. However, the scope of the invention is not limited to the disclosed embodiments.

<Configuration of an Imaging Forming System>

Figure 1:
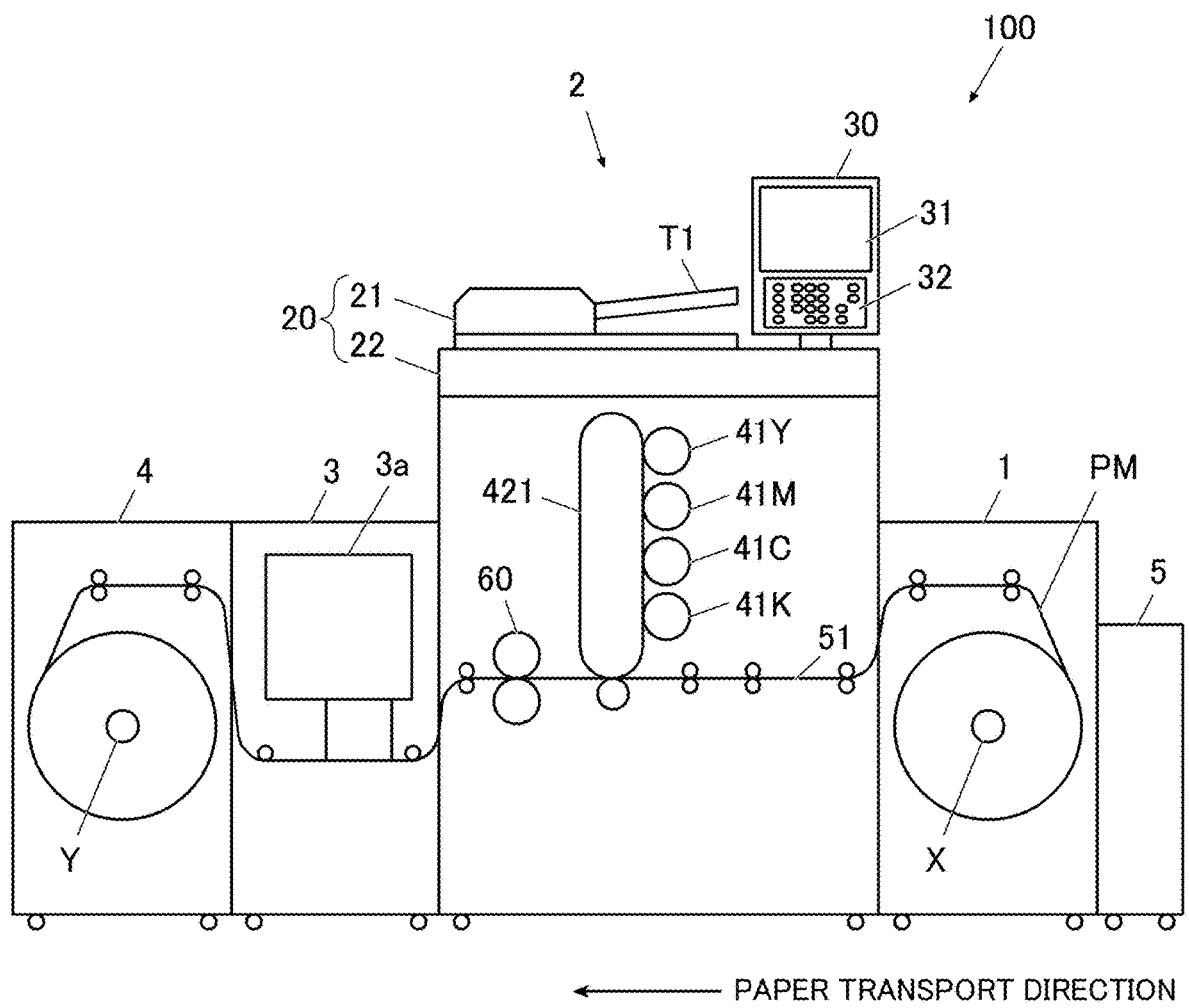
FIG. 1 is a schematic diagram showing the schematic configuration of an image forming system.
Figure 2:
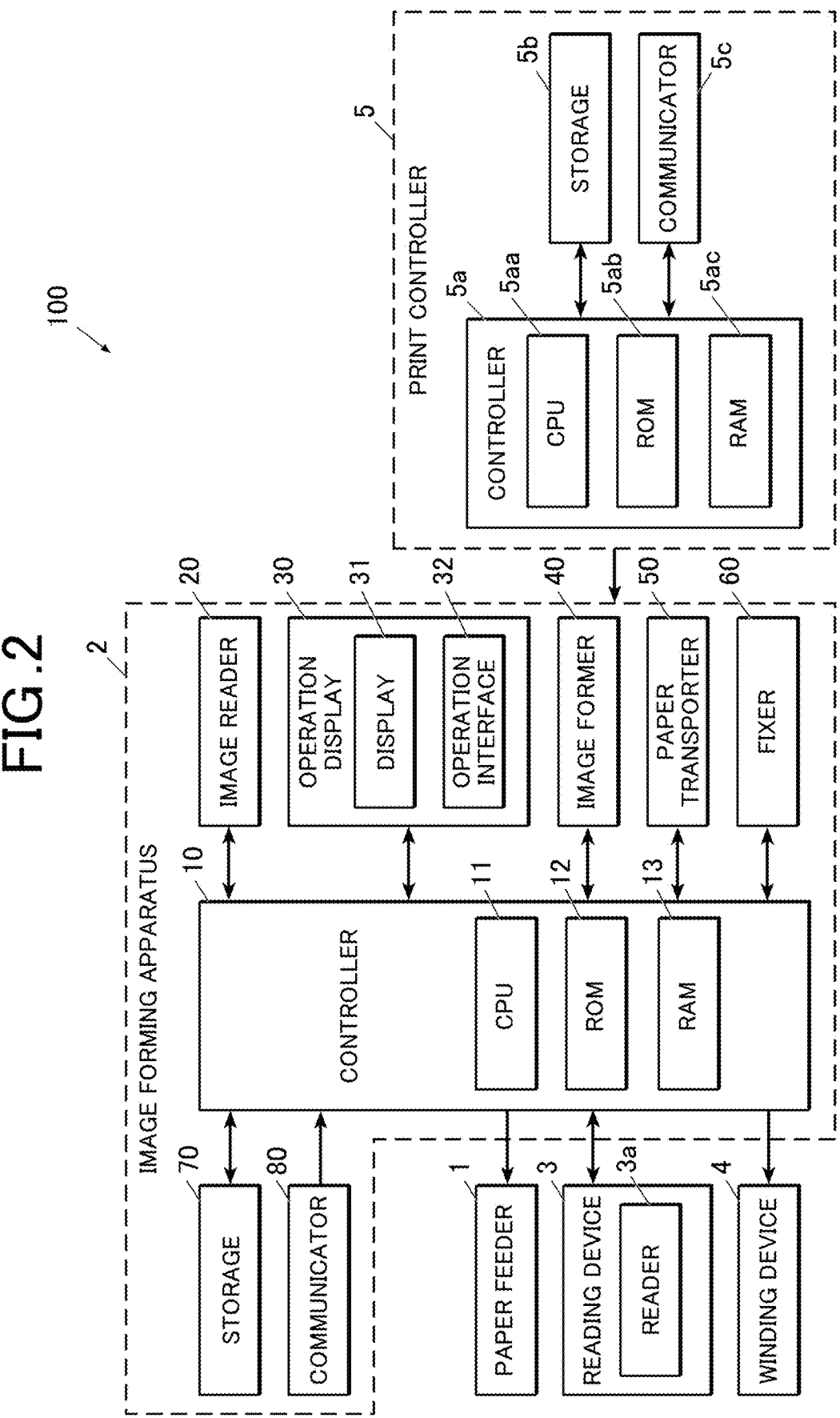
FIG. 2 is a block diagram showing the functional configuration of the image forming system.

FIG. 1 is a schematic diagram showing the schematic configuration of an image forming system 100 according to the present embodiment. FIG. 2 is a block diagram showing the functional configuration of the image forming system 100 according to the present embodiment.

The image forming system 100 is a system that forms an image on a roll-shaped continuous recording medium PM by using the continuous recording medium PM.

As shown in FIG. 1, in the image forming system 100, a print controller 5, a paper feeder 1, an image forming apparatus 2, a reading device 3, and a winding device 4 are connected in this order from the upstream side along the transport direction of the continuous recording medium PM (paper transport direction).

The paper feeder 1 is a device that feeds the continuous recording medium PM to the image forming apparatus 2. The paper feeder 1 transports the continuous recording medium PM wound around a support shaft X to the image forming apparatus 2 at a constant speed through a plurality of pairs of transport rollers, such as a delivery roller and a paper feed roller.

The paper feed operation of the paper feeder 1 is controlled by a controller 10 provided in the image forming apparatus 2.

The image forming apparatus 2 forms an image by an intermediate transfer method using an electrophotographic process technology.

As shown in FIG. 2, the image forming apparatus 2 includes the controller 10, an image reader 20, an operation display 30, an image former 40, a paper transporter 50, a fixer 60, a storage 70, a communicator 80, and the like.

The controller 10 includes a CPU (central processing unit) 11, a ROM (mad only memory) 12, a RAM (random access memory) 13, and the like.

The CPU 11 reads a program corresponding to the processing content from the ROM 12 and loads the program to the RAM 13 to centrally control the operations of each block of the image forming apparatus 2, the paper feeder 1, the reading device 3, the winding device 4, and the like in cooperation with the loaded program.

The image reader 20 includes an automatic document feeder 21 called an ADF, a document image scanner 22 (scanner), and the like.

The automatic document feeder 21 transports a document placed on a document tray T1 by a transport mechanism to send the document to the document image scanner 22. By the automatic document feeder 21, images (including both sides) of a large number of documents placed on the document tray T1 can be mad continuously at once.

The document image scanner 22 optically scans a document transported onto the contact glass from the automatic document feeder 21 or a document placed on the contact glass, and forms an image of light reflected from the document on the light receiving surface of a CCD (charge coupled device) sensor to read the document image. The image reader 20 generates image data based on the result of reading by the document image scanner 22.

The operation display 30 is, for example, a liquid crystal display (LCD) with a touch panel, and functions as a display 31 and an operation interface 32.

The display 31 displays various operation screens, an image state, an operation state of each function, and the like according to a display control signal input from the controller 10.

The operation interface 32 includes various operation keys such as a numeric keypad and a start key, and receives various input operations by the user and outputs an operation signal to the controller 10.

The image former 40 forms toner images of respective colors of Y (yellow). M (magenta). C (cyan), and K (black) on photosensitive drums 41Y, 41M, 41C, and 41K based on the image data input from the image reader 20 or the image data input from the print controller 5 through the communicator 80. Then, the image former 40 sequentially primary-transfers the formed toner images of the respective colors onto an intermediate transferbelt 421 to superimpose the toner images of the four colors and secondary-transfers the toner images of the respective colors onto the continuous recording medium PM fed from the paper feeder 1, thereby forming an image.

The paper transporter 50 has a transport path portion 51 including a plurality of transport roller pairs.

The continuous recording medium PM transported to the image forming apparatus 2 is transported to the image former 40 through the transport path portion 51. Then, in the image former 40, the toner images on the intermediate transfer belt 421 are collectively secondary-transferred onto one surface of the continuous recording medium PM. Then, fixing processing is performed by the fixer 60. The image-formed continuous recording medium PM is transported to the reading device 3.

The fixer 60 fixes the toner images to the continuous recording medium PM by heating and pressing the continuous recording medium PM on which the toner images are formed with a fixing nip. The continuous recording medium PM on which the toner images are fixed is an output product.

The storage 70 is, for example, a nonvolatile semiconductor memory (so-called flash memory) or a hard disk drive.

Input document data, various kinds of setting information, image data, and the like are stored in the storage 70. The pieces of data and the like may be stored in the RAM 13 of the controller 10.

The communicator 80 is, for example, a communication control card such as a LAN (local area network) card, and is used to transmit and receive various kinds of data to and from the print controller 5 and an external device (for example, a personal computer) connected to a communication network, such as a LAN or a WAN (wide area network).

The communicator 80 may be connected to the print controller 5 through a dedicated line such as a PCI (peripheral component interconnect) connection.

The reading device 3 includes a reader 3a for reading an image on the surface of the continuous recording medium PM.

The reader 3a reads an image on the surface of the transported continuous recording medium PM, and transmits the reading result to the controller 10.

The reader 3a may be a line sensor or may be a colorimeter or the like that reads an image at points, and the present invention is not limited to a specific one as long as it is possible to read an image. In the present embodiment, the reader 3a has been described as having a configuration capable of reading an image on one side of paper. However, images on both sides may be read by two readers, and a reversing transport path may be provided to reverse the paper and images on both sides of the paper may be read by one reader.

In particular, the reader 3a reads a gradation correction patch P1, which will be described later.

The reader 3a transmits a result of reading the gradation correction patch P1 to the controller 10. Then, the controller 10 detects gradation deviation based on the reading result, calculates an adjustment value (correction value) for gradation correction, and applies the adjustment value to the job image formed by the image former 40. The image quality can be corrected by using the charging bias of a charging device, the exposure light amount and exposure position of an exposure device, the developing bias of a developing device, density correction characteristics, and the like. Therefore, it is possible to prevent image changes on the output product of the print job and accordingly stabilize colors. When forming an image on the continuous recording medium PM, job image formation is performed while adjusting the image quality. For this reason, the image quality adjustment is called real-time image quality adjustment.

The winding device 4 is a device that winds up the continuous recording medium PM transported from the reading device 3.

The winding device 4 winds the continuous recording medium PM transported from the reading device 3 onto a support shaft Y at a constant speed through a plurality of transport roller pairs (for example, delivery rollers and paper discharge rollers).

The winding operation of the winding device 4 is controlled by the controller 10.

The print controller 5 creates print image data by performing predetermined processing on the print data of a print job received from an external device, and transmits the print image data to the image forming apparatus 2. Therefore, the print controller 5 functions as an image processing apparatus.

As shown in FIG. 2, the print controller 5 includes a controller 5a (hardware processor), a storage 5b, and a communicator Sc.

The controller 5a includes a CPU 5aa, a ROM 5ab, a RAM 5ac, and the like.

The CPU 5aa reads a program corresponding to the processing content from the ROM 5ab and loads the program to the RAM 5ac to centrally control the operation of each block of the print controller 5 in cooperation with the loaded program.

The controller 5a analyzes the print data of the print job described in a page description language (PDL), which has been received from the external device through the communicator Sc, and converts the print data into intermediate data.

Then, the controller 5a reads the generated intermediate data, and performs rasterization processing using a raster image processor (RIP) to generate RIP image data in a bitmap format for each color of YMCK.

The controller 5a generates an image based on the print data of the print job and print image data for forming an image quality adjustment patch at a predetermined cycle. The controller 5a functions as a generator. The controller 5a executes replacement processing for replacing a predetermined image with an image quality adjustment patch based on the image quality state of the output product (continuous recording medium PM on which the image of the job and the image quality adjustment patch are formed) or the state of the image former 40. The controller 5a functions as a replacer.

The state of the image former 40 includes the toner consumption amount of the image former 40, a frequency with which gradation correction is performed with respect to the transport amount of the continuous recording medium PM, and the like.

The controller 5a receives a permission instruction to permit the execution of replacement processing before image formation. The controller 5a functions as a receiver.

The controller 5a determines whether or not to execute replacement processing during image formation. The controller 5a functions as a first determiner.

During image formation, the controller 5a determines whether or not gradation correction is required based on a result of reading the image quality adjustment patch formed on the output product. The controller 5a functions as a second determiner.

During image formation, the controller 5a calculates a first toner consumption amount, which is the amount of toner currently consumed by the image former 40 in the print job. The controller 5a functions as a first calculator.

The controller 5a determines whether or not to execute replacement processing before image formation. The controller 5a functions as a third determiner.

Before image formation, the controller 5a calculates a second toner consumption amount, which is the amount of toner consumed by the image former 40 for each page of the print image data generated based on the print data. The controller 5a functions as a second calculator.

The storage 5b is, for example, a nonvolatile semiconductor memory or a hard disk drive.

Print data of a print job received from an external device, print image data generated by performing predetermined processing, various kinds of setting information, and the like are stored in the storage 5b. The pieces of data and the like may be stored in the ROM 5ab of the controller 5a.

The image data of the image quality adjustment patch is stored in the storage 5b.

The communicator 5c is, for example, a communication control card such as a LAN card, and is used to transmit and receive various kinds of data to and from the image forming apparatus 2 and an external device connected to a communication network, such as a LAN or a WAN.

The communicator Sc may be connected to the image forming apparatus 2 through a dedicated line such as a PCI connection.

<Image Quality Adjustment Patch>

An image quality adjustment patch will be described.

The image quality adjustment patch is an image arranged in the RIP image by the print controller 5 and formed on the continuous recording medium PM by the image forming apparatus 2.

Image quality adjustment patches include the gradation correction patch P1 and a coverage rate correction patch P2. The coverage rate is specified based on the ratio of the toner-applied area to the total area of the recording medium or output product and the gradation value in the toner-applied area.

Figure 3:
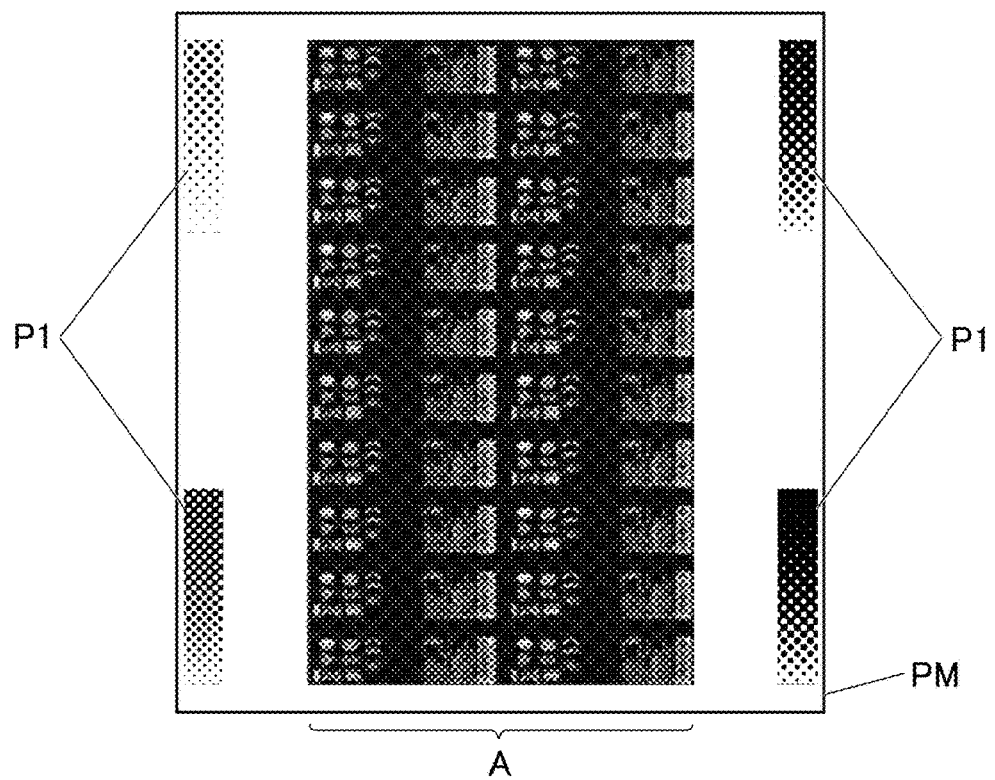
FIG. 3 is a diagram showing an example of a gradation correction patch.

FIG. 3 shows examples of the gradation correction patch P1 and a job image A of a print job that are formed on the continuous recording medium PM.

The gradation correction patch P1 is a patch used for adjusting the color of the image formed by the image forming apparatus 2 as described above. The gradation correction patch P1 is, for example, a step wedge image including patch-like density steps whose density changes stepwise as shown in FIG. 3.

Since the gradation correction patch P1 is read by the reader 3a as described above, the gradation correction patch P1 is formed at a position on the continuous recording medium PM (for example, both ends of the continuous recording medium PM) that can be read by the reader 3a.

Figure 4:
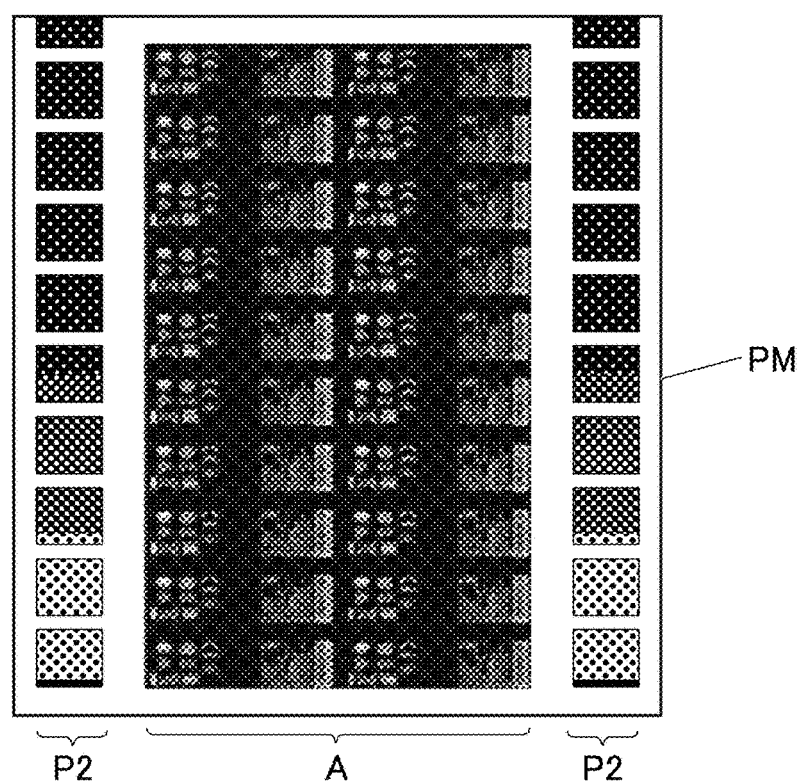
FIG. 4 is a diagram showing an example of a coverage rate correction patch.

FIG. 4 shows examples of the coverage rate correction patch P2 and the job image A of the print job that are formed on the continuous recording medium PM.

The coverage rate correction patch P2 is a patch for consuming old toner when the coverage rate is low in the print image data (when the amount of toner consumption is small).

The coverage rate correction patch P2 may be formed at any position on the continuous recording medium PM.

<Operation of an Image Forming System>

Figure 5:
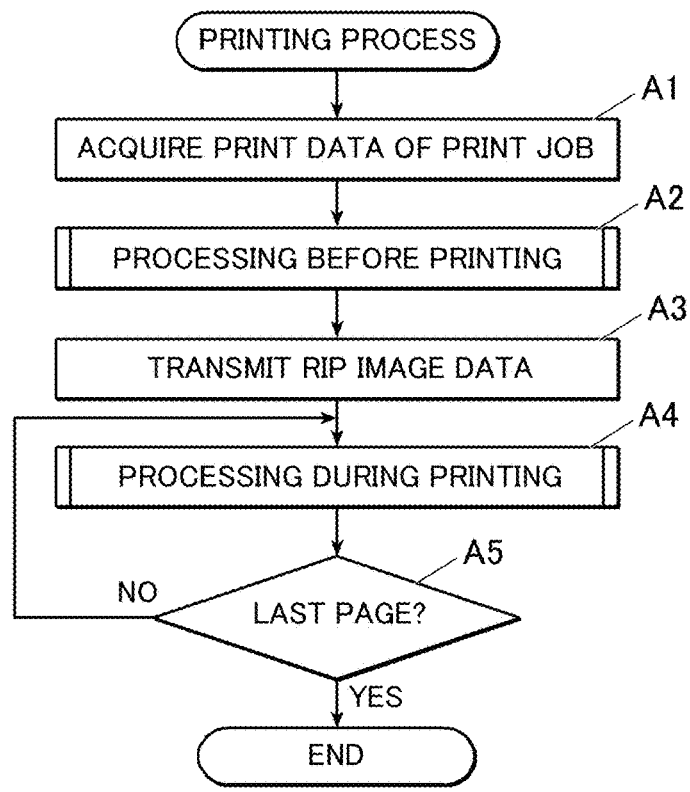
FIG. 5 is a flowchart showing a printing process.

FIG. 5 is a flowchart showing a printing process executed in the image forming system 100.

(Printing Process)

First, the controller 5a acquires print data of a print job by receiving the print data of the print job from an external device (step A1). The controller 5a may acquire the print data of the print job from the storage 5b.

The print data of the print job includes patch arrangement information.

The patch arrangement information is information indicating the ratio of the gradation correction patch P1 and the coverage rate correction patch P2 to be arranged in the RIP image, and is information for forming the image quality adjustment patch at a predetermined cycle.

The print data of the print job includes a permission instruction when the user has set a permission to execute replacement processing for replacing a predetermined image with an image quality adjustment patch in the print job. In other words, the controller 5a receives a permission instruction to permit the execution of replacement process before image formation. The controller 5a functions as a receiver.

The controller 5a may receive the permission instruction by input from the operation interface 32 when executing the print job.

The print data of the print job includes a job image replacement instruction when the user has set replacing a part of the job image of the print job with the image quality adjustment patch.

When the print data of the print job includes the job image replacement instruction, the print data of the print job includes information regarding whether to replace the range specified in the job image with the image quality adjustment patch or to replace each object attribute in the job image with the image quality adjustment patch. Object attributes in the job image are text or images. The text is an attribute of an image mainly including characters, and the image is an attribute of a multi-gradation image that is mainly a photograph or the like.

Figure 6:
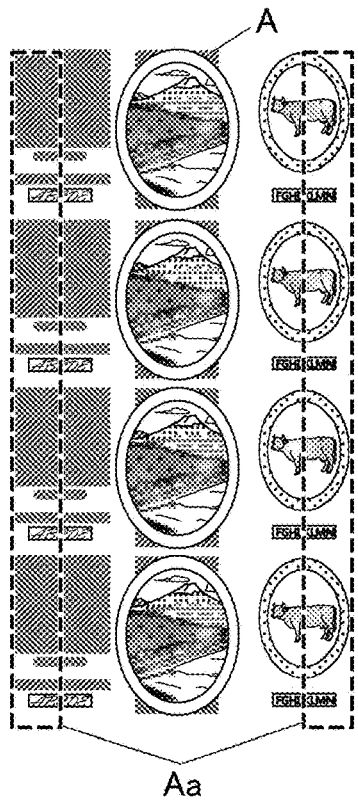
FIG. 6 is a diagram showing an example of a range specified in a job image.

The print data of the print job includes specified range information in the job image when the range specified in the job image is replaced with an image quality adjustment patch. FIG. 6 shows an example of a range Aa specified in the job image A.

Figure 7:
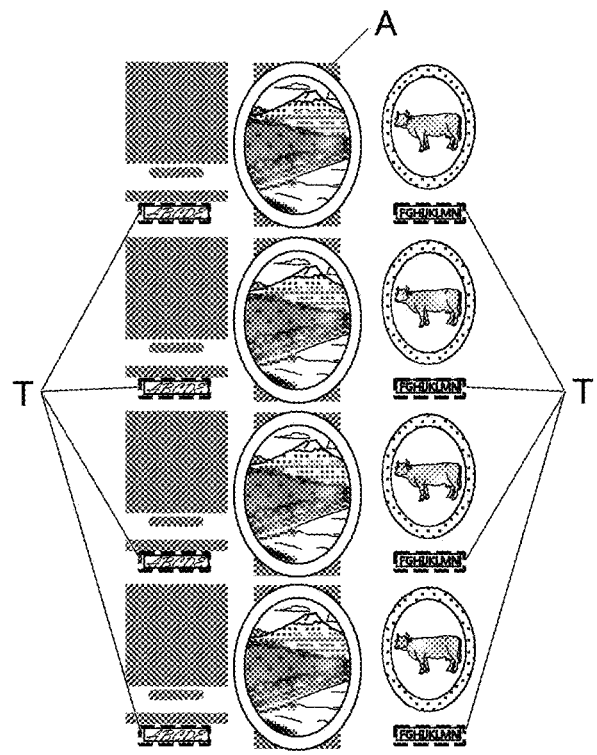
FIG. 7 is a diagram showing text in a job image.

When each object attribute in the job image is replaced with the image quality adjustment patch, the print data of the print job includes specified attribute information, which is information regarding which object attribute is to be replaced with the image quality adjustment patch. The specified attribute information is, for example, information indicating that text T in the job image A is replaced with the image quality adjustment patch as shown in FIG. 7.

Figure 8:
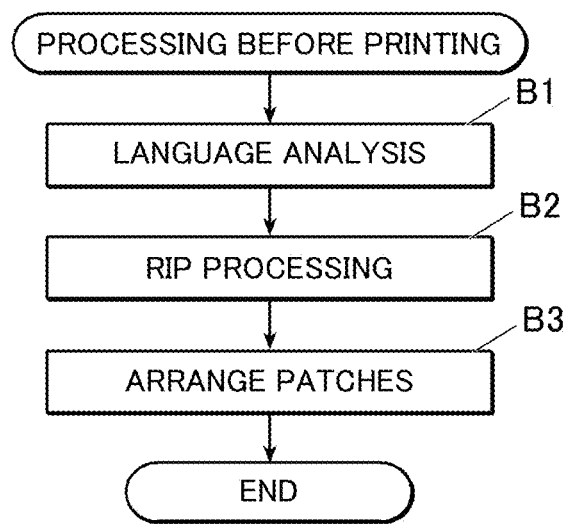
FIG. 8 is a flowchart showing processing before printing.

Then, the controller 5a executes processing before printing shown in FIG. 8 (step A2).

(Processing Before Printing)

In the processing before printing, first, the controller 5a analyzes the page description language of the print data of the print job acquired in step A1 of the printing process, and generates intermediate data (step B1). Then, the controller 5a reads the intermediate data generated in step B1, and performs rasterization processing to generate RIP image data in a bitmap format (step B2).

Then, the controller 5a determines image quality adjustment patches to be arranged in the RIP image based on the patch arrangement information acquired in step A1 of the printing process and arranges the determined image quality adjustment patches in the RIP image generated in step B2 (step B3), and ends this process.

In step B3, for example, the controller 5a determines that the coverage rate correction patch P2 is to be arranged on four of the five pages of the RIP image and the gradation correction patch P1 is to be arranged on the remaining one of the five pages. Alternatively, the controller 5a may always determine to arrange the coverage rate correction patch P2.

Thus, the coverage rate correction patch P2 may be preferentially arranged, or the gradation correction patch P1 may be preferentially arranged.

Returning to FIG. 5, the controller 5a transmits the RIP image data after arranging the image quality adjustment patches in step A2 to the image forming apparatus 2 as print image data (step A3).

When the print image data is received, the image forming apparatus 2 starts image formation (printing) based on the print image data.

Figure 9:
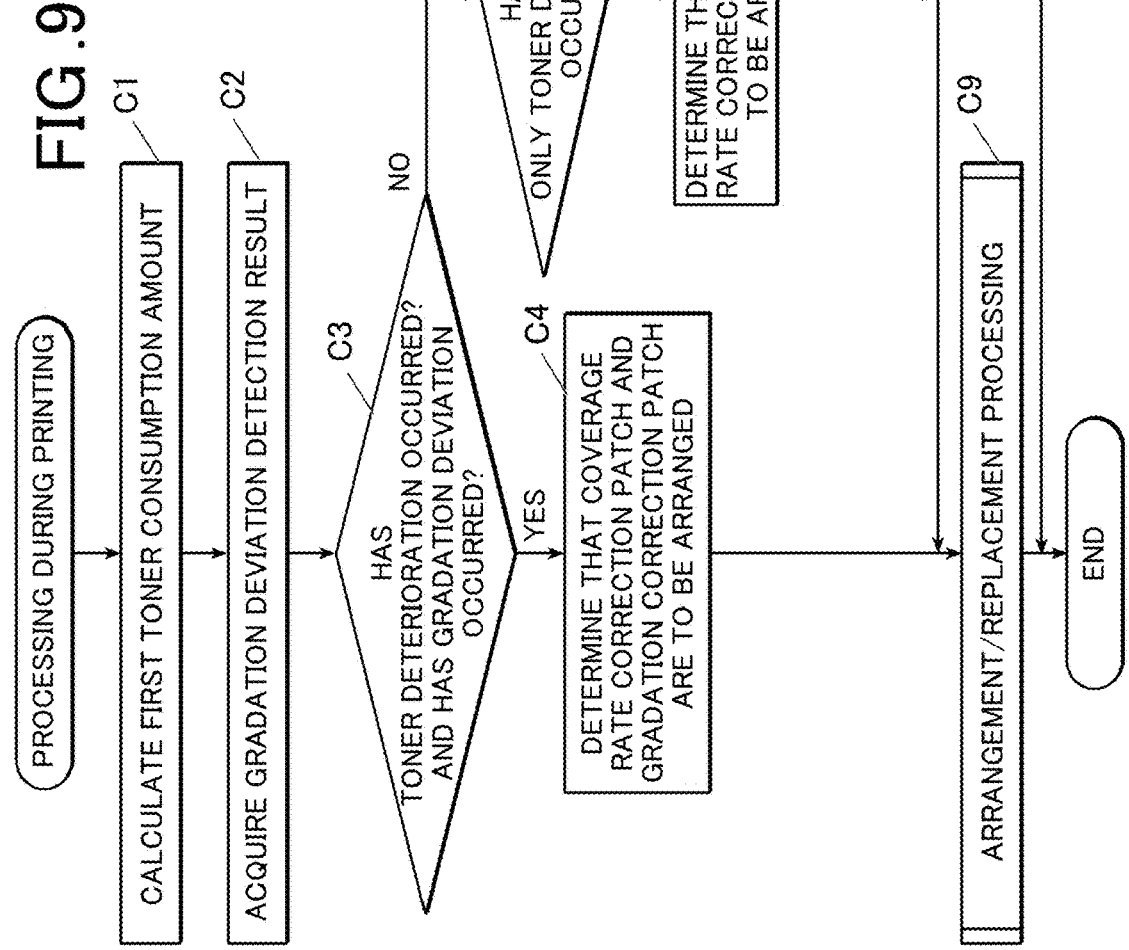
FIG. 9 is a flowchart showing processing during printing.

Then, the controller 5a executes processing during printing shown in FIG. 9 (step A4).

(Processing During Printing)

In the processing during printing, first, the controller 5a calculates the first toner consumption amount, which is a current toner consumption amount in a print job being printed (step C1). Specifically, the controller 5a calculates the consumption amount of first toner currently consumed by the image former 40 in the print job from the print image data or image forming conditions such as the number of prints. The controller 5a functions as a first calculator.

Then, the controller 5a acquires a gradation deviation detection result from the controller 10 of the image forming apparatus 2 (step C2).

Then, the controller 5a determines whether or not the first toner consumption amount calculated in step C1 is less than a predetermined first threshold value. When the first toner consumption amount is less than the predetermined first threshold value, the controller 5a determines that toner deterioration has occurred.

The controller 5a determines whether or not gradation deviation has occurred based on the gradation deviation detection result acquired in step C2. Then, when gradation deviation has occurred, the controller 5a determines that gradation correction is required. That is, the controller 5a determines whether or not gradation correction is required based on the result of reading the image quality adjustment patch formed on the output product. The controller 5a functions as a second determiner.

Then, the controller 5a determines whether or not toner deterioration has occurred and gradation deviation has occurred (step C3).

If toner deterioration has occurred and gradation deviation has occurred (step C3; YES), the controller 5a determines that both the gradation correction patch P1 and the coverage rate correction patch P2 are to be arranged in the RIP image in arrangement/replacement processing described later (step C4), and the process proceeds to step C9.

If at least one of toner deterioration and gradation deviation has not occurred (step C3; NO), the controller 5a determines whether or not only toner deterioration has occurred (step C5).

If only toner deterioration has occurred (step C5; YES), the controller 5a determines that the coverage rate correction patch P2 is to be arranged in the RIP image in the arrangement/replacement processing (step C6), and the process proceeds to step C9.

If toner deterioration has not occurred (step C5; NO), the controller 5a determines whether or not only gradation deviation has occurred (step C7).

If only gradation deviation has occurred (step C7; YES), the controller 5a determines that the gradation correction patch P1 is to be arranged in the RIP image in the arrangement/replacement processing (step C8), and the process proceeds to step C9.

If neither toner deterioration nor gradation deviation has occurred (step C7; NO), the controller 5a ends this process.

Figure 10:
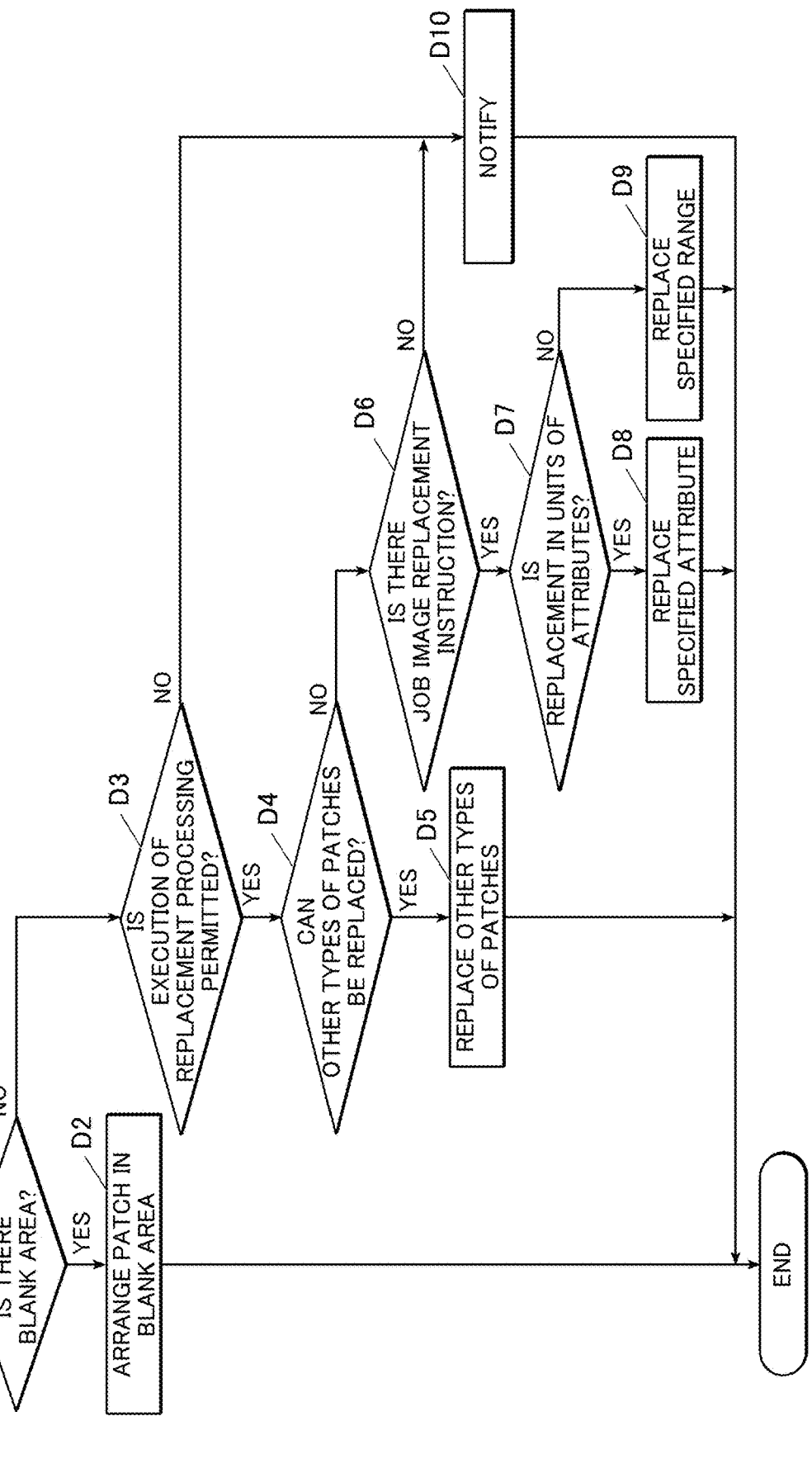
FIG. 10 is a flowchart showing arrangement/replacement processing.

In step C9, the controller 5a executes arrangement/replacement processing shown in FIG. 10, and ends this process.

(Arrangement/Replacement Processing)

In arrangement/replacement processing, first, the controller 5a determines whether or not there is a blank area where no image is formed in the RIP image (step D1).

If there is a blank area (step D1; YES), the controller 5a arranges the image quality adjustment patch determined to be arranged in the processing during printing (hereinafter, referred to as an arrangement determination patch) in the blank area (step D2), and ends this process.

Figure 11:
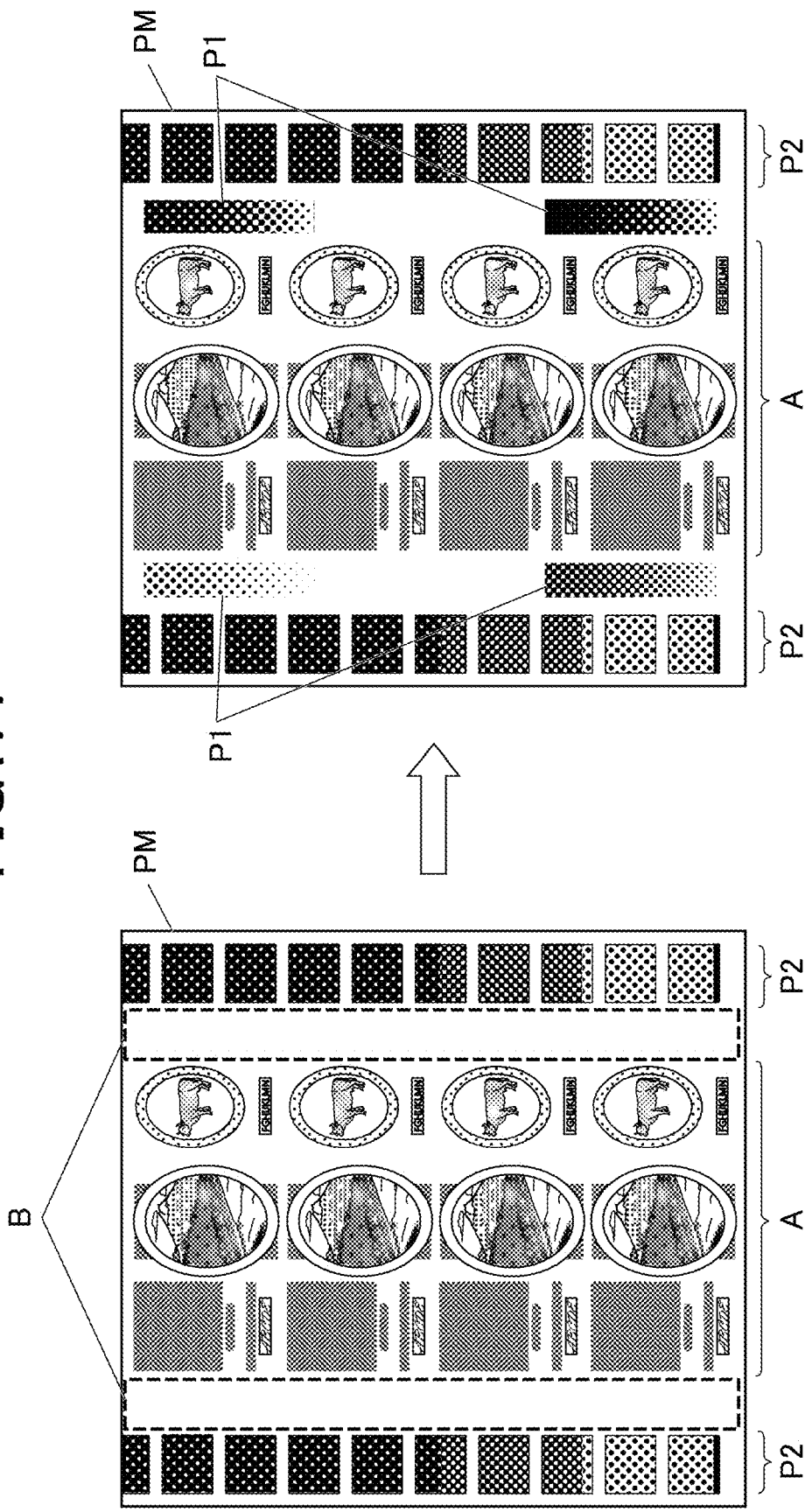
FIG. 11 is a diagram showing an example of arranging an image quality adjustment patch in a blank area.

FIG. 11 shows an example of arranging the image quality adjustment patch in a blank area B. In the example shown in FIG. 11, the arrangement determination patch is the gradation correction patch P1.

In the example shown in FIG. 11, the gradation correction patch P1 is arranged in the blank area B of the RIP image where the coverage rate correction patch P2 is already arranged. In this manner, step C4 of the above-described processing during printing (arranging both the gradation correction patch P1 and the coverage rate correction patch P2) may be realized.

If there is no blank area (step D1; NO), the controller 5a determines whether or not the print data of the print job acquired in step A1 of the printing process includes a permission instruction to permit the execution of replacement processing (step D3).

If a permission instruction is included (step D3; YES), the controller 5a determines whether or not other types of patches can be replaced with arrangement determination patches in the RIP image (step D4).

Specifically, when other types of patches that are not arrangement determination patches are arranged in the RIP image, the controller 5a determines that the other types of patches can be replaced with the arrangement determination patches. When other types of patches are not arranged in the RIP image, the controller 5a determines that replacement by the arrangement determination patch is not possible.

If the other types of patches can be replaced with the arrangement determination patches (step D4; YES), the controller 5a replaces the other types of patches with the arrangement determination patches (step D5), and ends this process.

FIG. 12 shows an example of replacing the gradation correction patch P1 with the coverage rate correction patch P2. In the example shown in FIG. 12, the other types of patches are the gradation correction patches P1, and the arrangement determination patch is the coverage rate correction patch P2.

Figure 13:
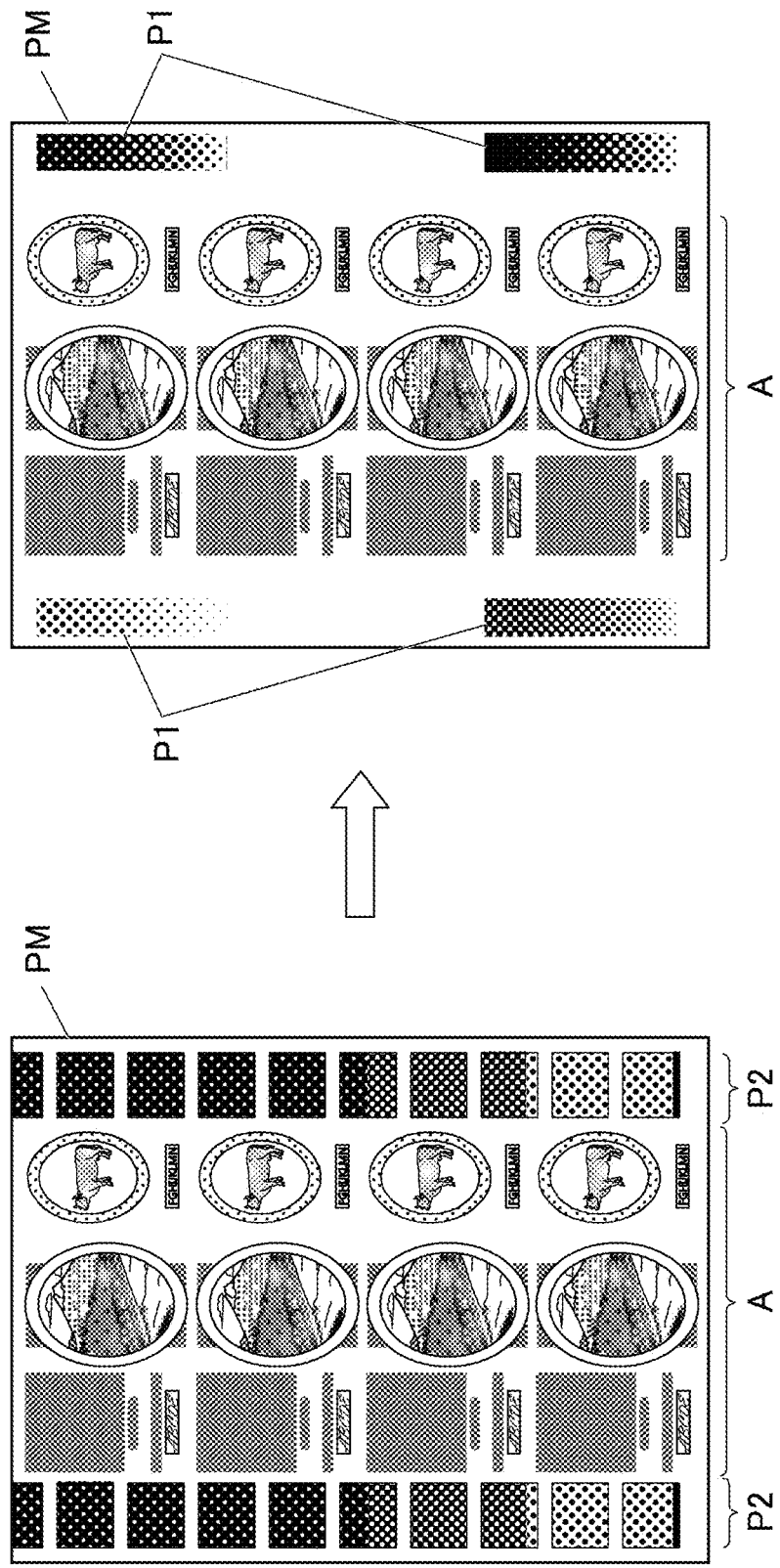
FIG. 13 is a diagram showing an example of replacing a coverage rate correction patch with a gradation correction patch.

FIG. 13 shows an example of replacing the coverage rate correction patch P2 with the gradation correction patch P1. In the example shown in FIG. 13, the other types of patches are the coverage rate correction patches P2, and the arrangement determination patch is the gradation correction patch P1.

If the other types of patches cannot be replaced with the arrangement determination patches (step D4; NO), the controller 5a determines whether or not the print data of the print job acquired in step A1 of the printing process includes a job image replacement instruction (step 16).

If the job image replacement instruction is included (step D6; YES), the controller 5a determines whether or not to replace each object attribute in the job image with the arrangement determination patch based on the print data (step D7).

If each object attribute in the job image is to be replaced with the arrangement determination patch (step D7; YES), the controller 5a replaces an object having any attribute in the job image with the arrangement determination patch based on the specified attribute information (step D8), and ends this process.

Figure 14:
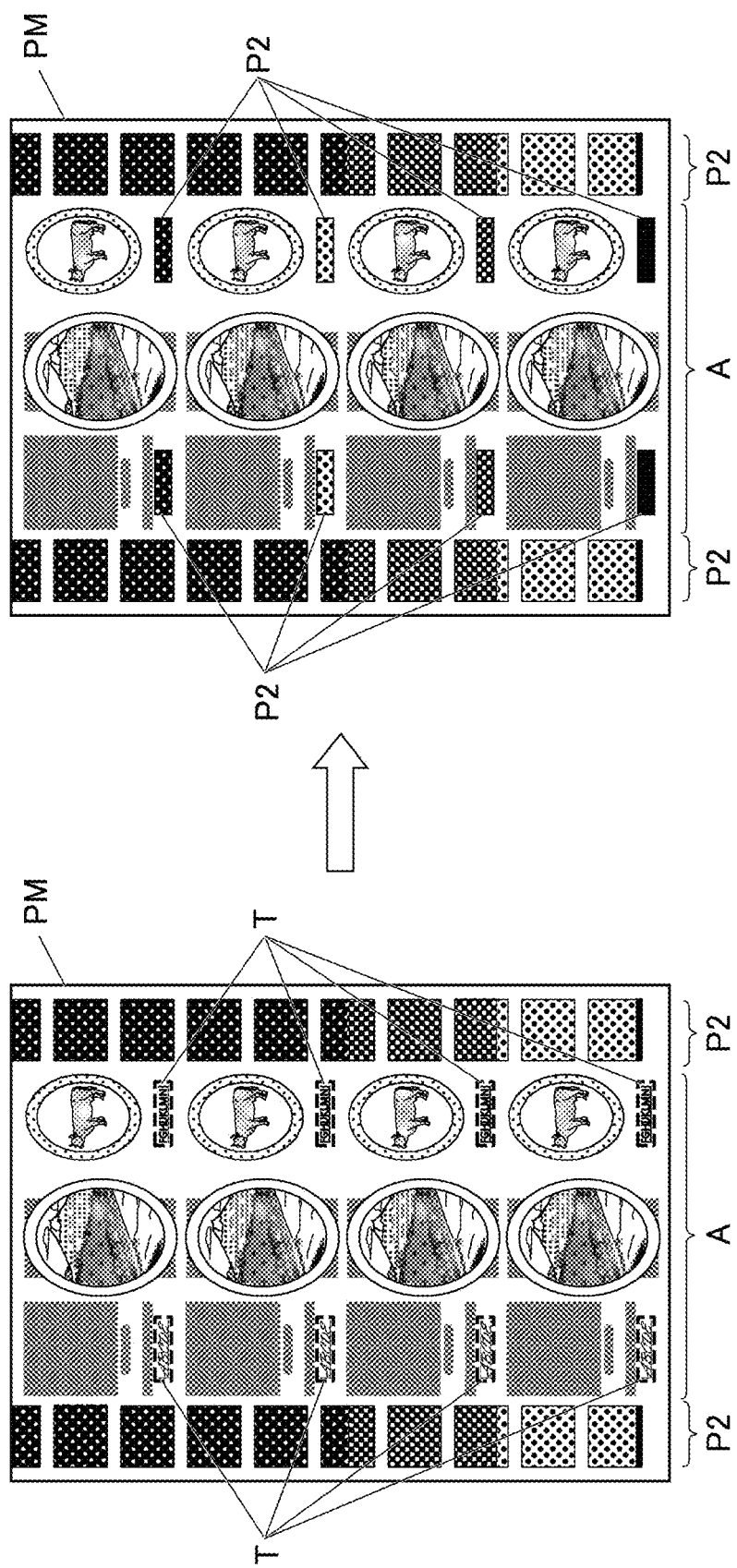
FIG. 14 is a diagram showing an example of replacing text in a job image with a coverage rate correction patch.

FIG. 14 shows an example of replacing the text T in the job image A with the arrangement determination patch. In the example shown in FIG. 14, the arrangement determination patch is the coverage rate correction patch P2.

If the range specified in the job image is to be replaced with the arrangement determination patch (step D7; NO), the controller 5a replaces the specified range in the job image with the arrangement determination patch based on the specified range information (step D9), and ends this process.

Figure 15:
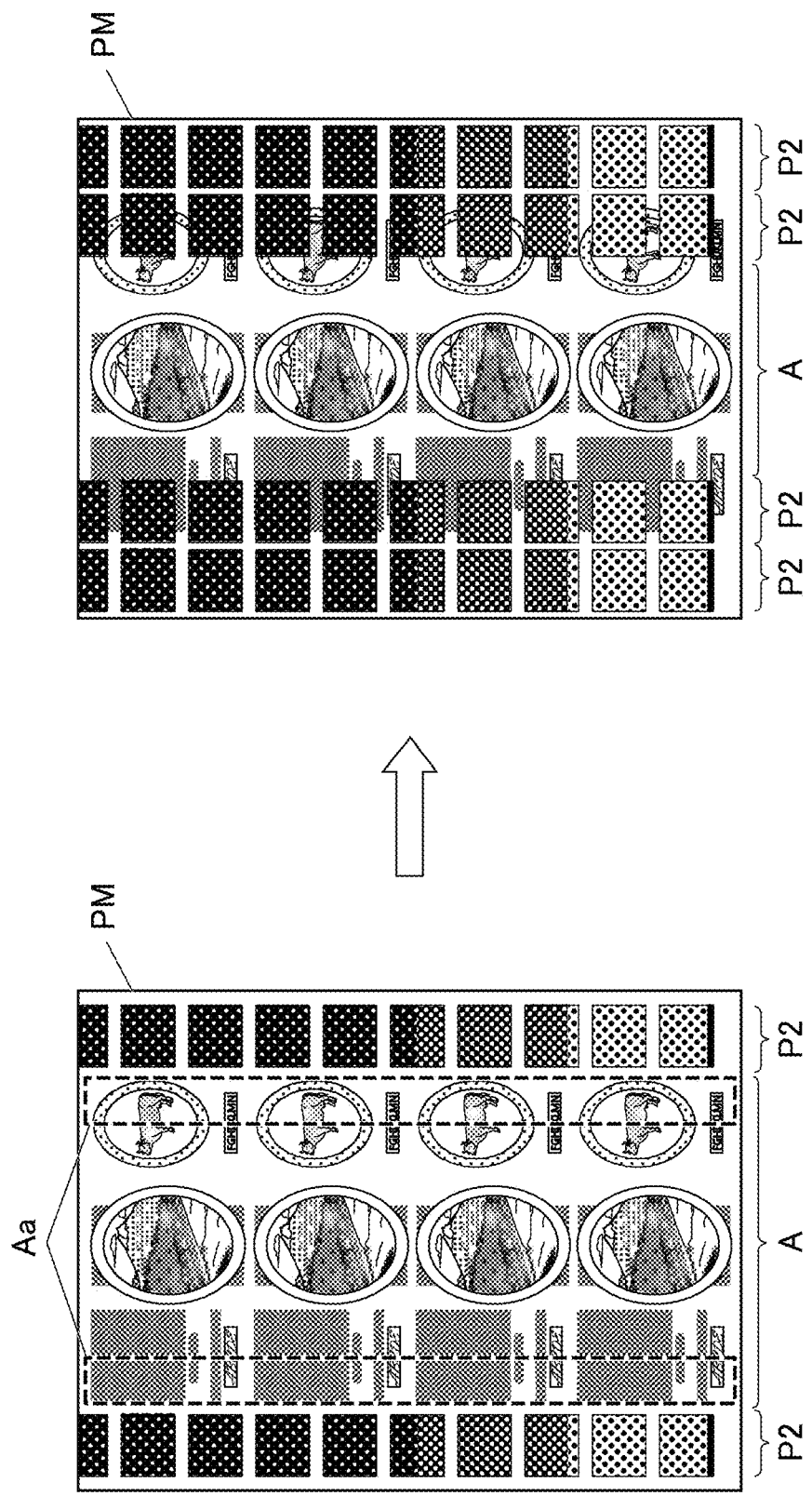
FIG. 15 is a diagram showing an example of replacing a range specified in a job image with a coverage rate correction patch.

FIG. 15 shows an example of replacing the range Aa specified in the job image A with the arrangement determination patch. In the example shown in FIG. 15, the arrangement determination patch is the coverage rate correction patch P2.

If the permission instruction is not included (step D3; NO) or if the job image replacement instruction is not included (step D6; NO), the controller 5a notifies the external device through the communicator Sc that at least one of toner deterioration and gradation deviation has occurred but the image quality adjustment patch cannot be arranged (step D10), and ends this process.

Figure 16:
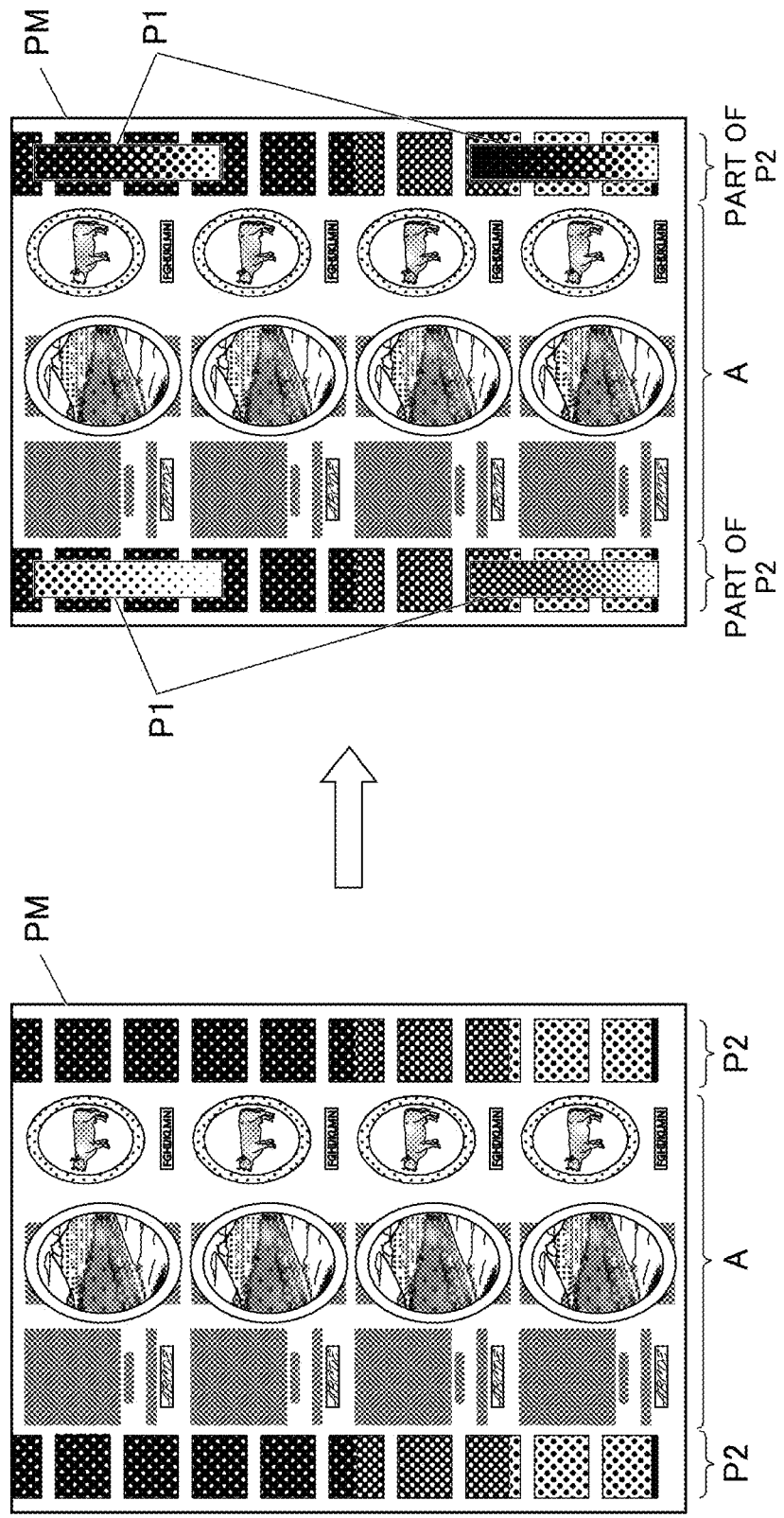
FIG. 16 is a diagram showing an example of replacing a part of a coverage rate correction patch with a gradation correction patch.

Step C4 of the above-described processing during printing (arranging both the gradation correction patch P1 and the coverage rate correction patch P2) may be realized by replacing a part of the coverage rate correction patch P2 with the gradation correction patch P1 as shown in FIG. 16.

As described above, the controller 5a determines whether or not to execute replacement processing during image formation by executing the processing during printing. The controller 5a functions as a first determiner.

Returning to FIG. 5, the controller 5a determines whether or not an image has been formed on the last page of the print job (step A5).

If an image has been formed on the last page (step A5; YES), the controller 5a ends this process.

If no image has been formed on the last page (step A5; NO), the controller 5a proceeds to step A4.

MODIFICATION EXAMPLES

Next, modification examples of the above embodiment will be described.

The following description will be given focusing on the differences from the embodiment described above.

Figure 17:
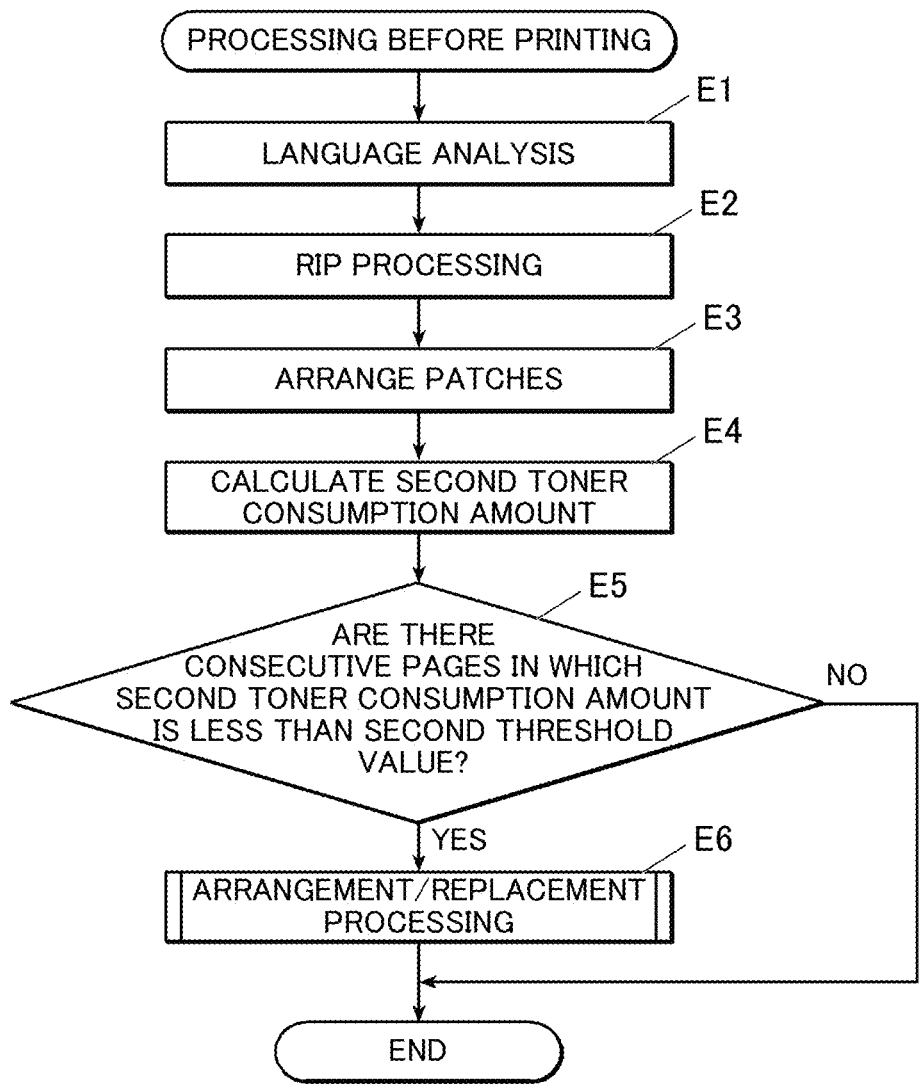
FIG. 17 is a flowchart showing processing before printing in a modification example.

FIG. 17 shows processing before printing in this modification example.

Processing Before Printing in Modification Example

In the processing before printing in this modification example, first, the controller 5a executes steps E1, E2 and E3 similar to steps B1. B2 and B3 of the processing before printing in the embodiment described above. Then, the controller 5a calculates the second toner consumption amount, which is the toner consumption amount of each page of the RIP image data on which the image quality adjustment patch is arranged in step E3 (step E4). That is, before image formation, the controller 5a calculates the second toner consumption amount, which is the amount of toner consumed by the image former 40 for each page of the print image data (RIP image data) generated based on the print data. The controller 5a functions as a second calculator.

Then, the controller 5a determines whether or not there are consecutive pages in which the second toner consumption amount calculated in step E4 is less than a predetermined second threshold value (step E5). The predetermined second threshold value is set in advance.

If there are no consecutive pages in which the second toner consumption amount is less than the predetermined second threshold value (step E5; NO), the controller 5a ends this process.

On the other hand, if there are consecutive pages in which the second toner consumption amount is less than the predetermined second threshold value (step E5; YES), it is necessary to consume toner by arranging the coverage rate correction patch P2 on a page preceding the consecutive pages or by replacing a predetermined image with the coverage rate correction patch P2. For this reason, the controller 5a executes arrangement/replacement processing (step E6), and ends this process.

Arrangement/Replacement Processing in Modification Example

A flowchart of the arrangement/replacement processing in this modification example is the same as the flowchart of the arrangement/replacement processing in the above-described embodiment shown in FIG. 10.

In the arrangement/replacement processing in this modification example, first, the controller 5a determines whether or not there is a blank area where no image is formed in the RIP image of a page (hereinafter, referred to as a "page before consecutiveness") preceding consecutive pages in which the second toner consumption amount is less than the predetermined second threshold value (step D1).

If there is a blank area (step D1; YES), the controller 5a arranges the coverage rate correction patch P2 in the blank area (step D2), and ends this process.

If them is no blank area (step D1; NO), the controller 5a determines whether or not the print data of the print job acquired in step A1 of the printing process includes a permission instruction to permit the execution of replacement processing (step D3).

If the permission instruction is included (step D3; YES), the controller 5a determines whether or not the other types of patches (here, the gradation correction patch P1) can be replaced with the coverage rate correction patches P2 on the page before consecutiveness (step D4).

Specifically, when the gradation correction patch Pt is arranged on the page before consecutiveness, the controller 5a determines that the gradation correction patch P1 can be replaced with the coverage rate correction patch P2. When the gradation correction patch P1 is not arranged on the page before consecutiveness, the controller 5a determines that the gradation correction patch Pt cannot be replaced with the coverage rate correction patch P2.

If the other types of patches can be replaced with the coverage rate correction patches P2 (step D4; YES), the controller 5a replaces the other types of patches with the coverage rate correction patches P2 (step D5), and ends this process.

Figure 18:
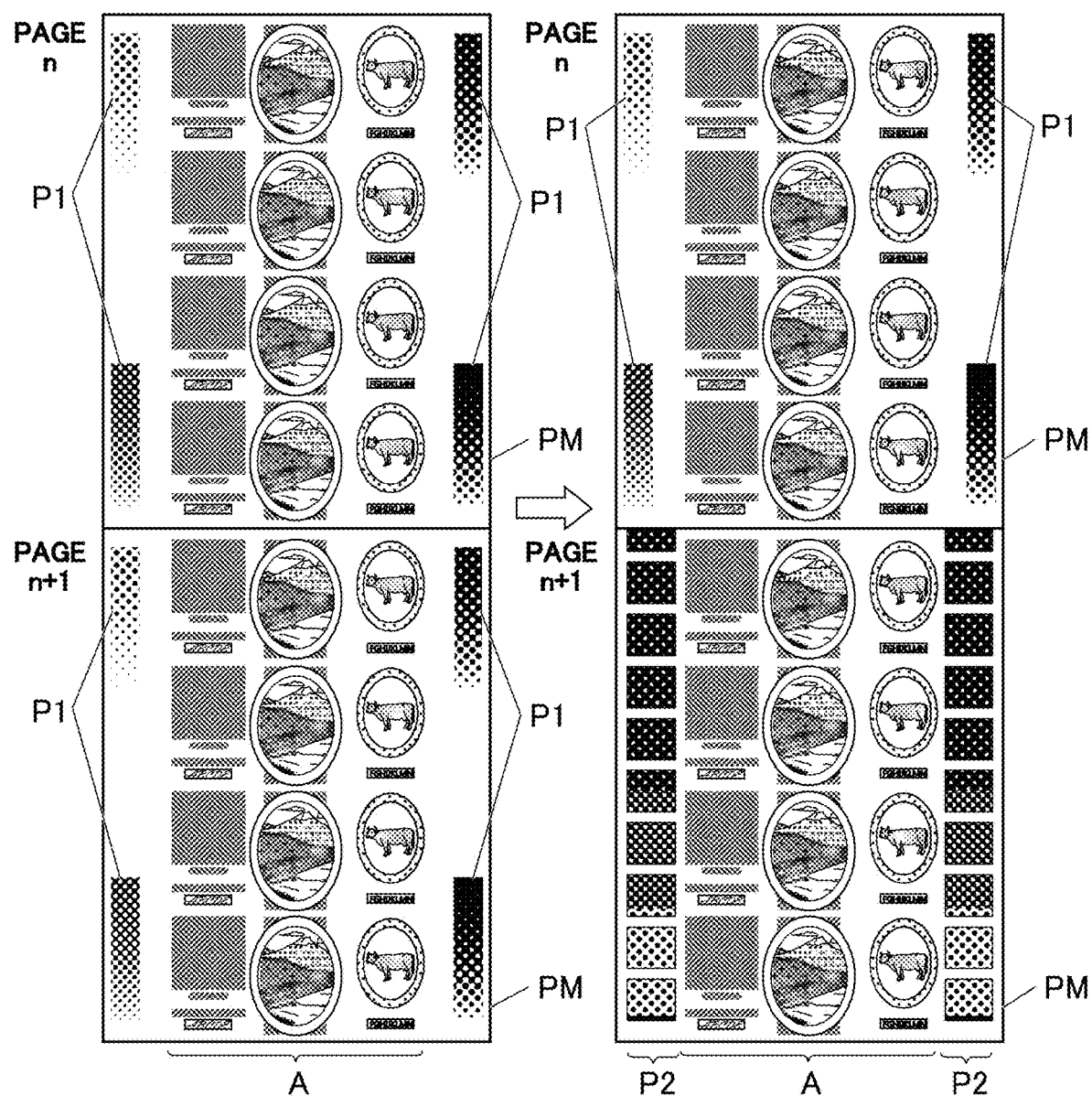
FIG. 18 is a diagram showing an example of replacing a gradation correction patch with a coverage rate correction patch in a modification example.

FIG. 18 shows an example of replacing the gradation correction patch P1 with the coverage rate correction patch P2 on a page n+1. In the example shown in FIG. 18, the page n+1 is a page before consecutiveness.

If the other types of patches cannot be replaced with the coverage rate correction patches (step D4; NO), the controller 5a determines whether or not the print data of the print job acquired in step A1 of the printing process includes a job image replacement instruction (step D6).

If the job image replacement instruction is included (step D6; YES), the controller 5a determines whether or not to replace each object attribute in the job image with the coverage rate correction patch P2 based on the print data (step D7).

If each object attribute in the job image is to be replaced with the coverage rate correction patch P2 (step D7; YES), the controller 5a replaces the object of any attribute in the job image with the coverage rate correction patch P2 based on the specified attribute information (step D8), and ends this process.

Figure 19:
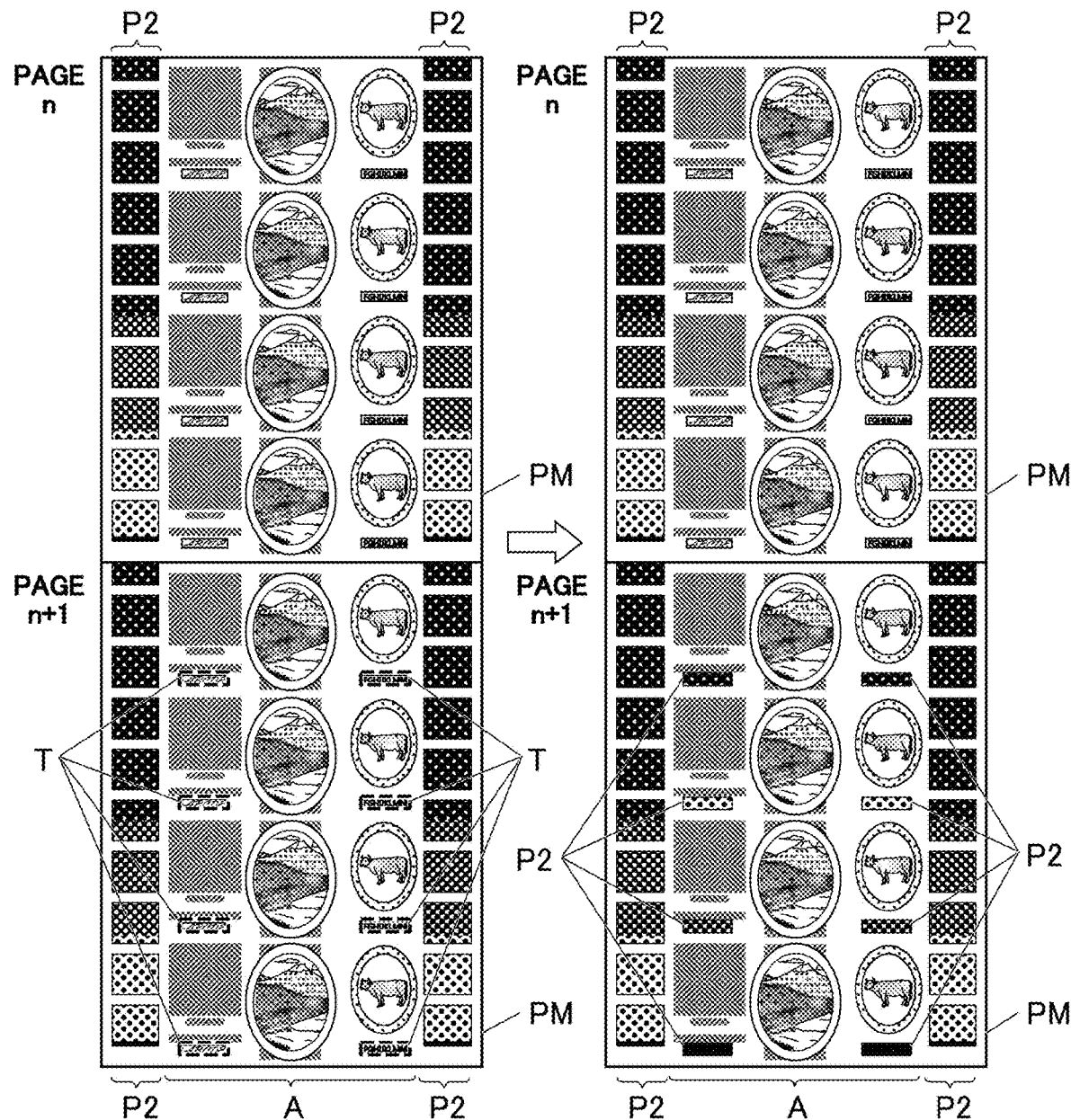
FIG. 19 is a diagram showing an example of replacing text in a job image with a coverage rate correction patch in a modification example.

FIG. 19 shows an example of replacing the text T in the job image A with the coverage rate correction patch P2 on the page n+1. In the example shown in FIG. 19, the page n+1 is a page before consecutiveness.

If the range specified in the job image is to be replaced with the coverage rate correction patch P2 (step D7; NO), the controller 5a replaces the specified range in the job image with the coverage rate correction patch P2 based on the specified range information (step D9), and ends this process.

Figure 20:
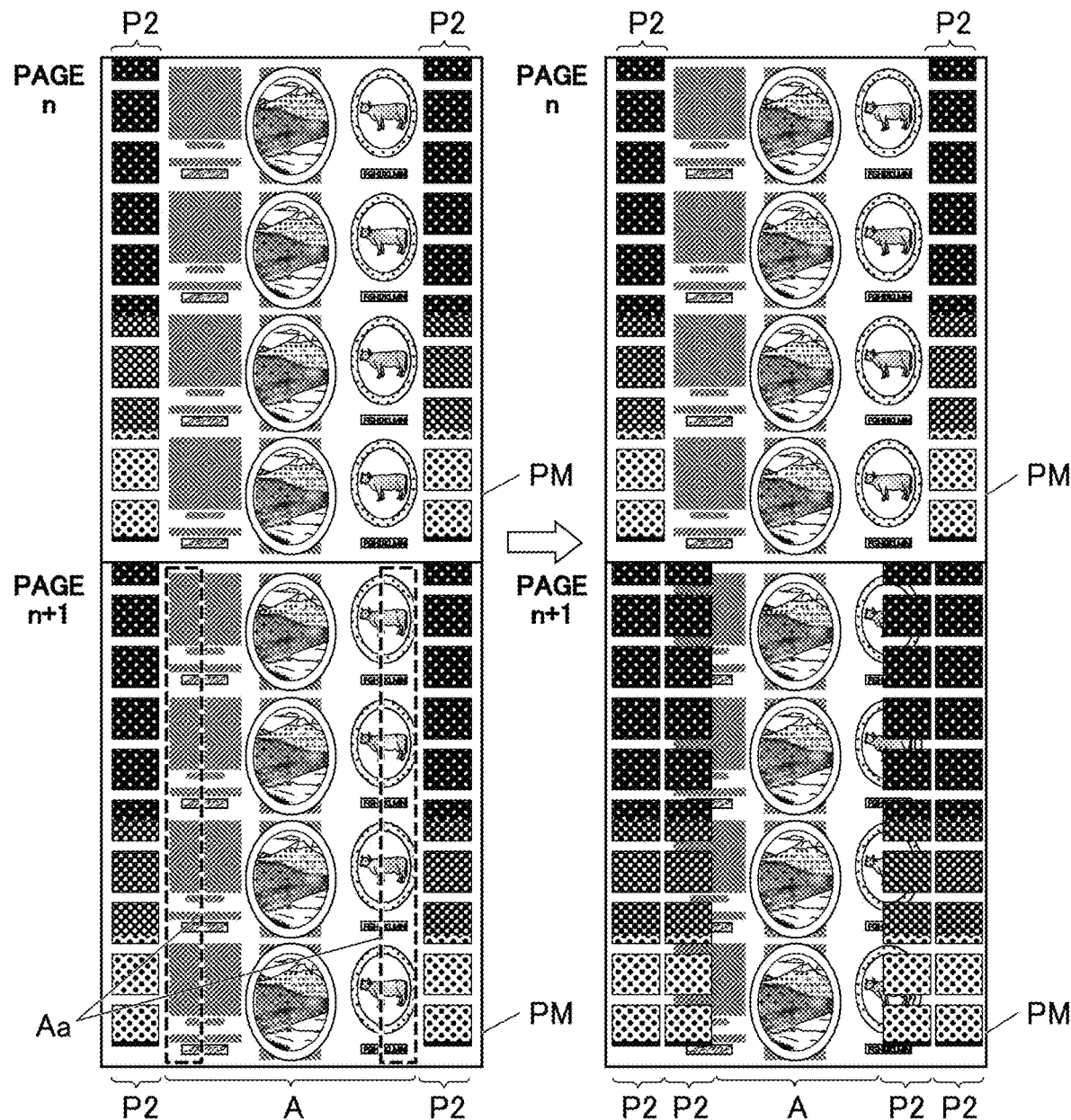
FIG. 20 is a diagram showing an example of replacing a range specified in a job image with a coverage rate correction patch in a modification example.

FIG. 20 shows an example of replacing the range Aa specified in the job image A with the coverage rate correction patch P2 in the page n+1. In the example shown in FIG. 20, the page n+1 is a page before consecutiveness.

If the permission instruction is not included (step D3; NO) or if the job image replacement instruction is not included (step 16; NO), the controller 5a notifies the external device through the communicator 5c that there are consecutive pages in which the second toner consumption amount is less than the predetermined second threshold value but the coverage rate correction patch P2 cannot be arranged or a predetermined image cannot be replaced with the coverage rate correction patch P2 (step D10), and ends this process.

As described above, the controller 5a determines whether or not to execute replacement processing before image formation by executing steps E5 and E6 of the processing before printing. The controller 5a functions as a third determiner.

As described above, the image processing apparatus (print controller 5) according to the present embodiment includes: a generator (controller 5a) that generates an image (job image A) based on print data of a print job and print image data for forming an image quality adjustment patch at a predetermined cycle; and a replacer (controller 5a) that executes replacement processing for replacing a predetermined image with an image quality adjustment patch based on the image quality state of the output product or the state of the image former 40.

Therefore, since it is possible to form an appropriate image quality adjustment patch based on the image quality state of the output product or the state of the image former 40, the image quality adjustment patch can be formed mom appropriately together with the job image.

In the image processing apparatus according to the present embodiment, the replacer executes replacement processing based on the result of reading the image quality adjustment patch, which is formed on the output product, as the image quality state of the output product.

Therefore, based on the result of reading the formed image quality adjustment patch (gradation correction patch P1), it is possible to appropriately form the image quality adjustment patch when gradation correction is required.

In the image processing apparatus according to the present embodiment, the replacer executes replacement processing based on the amount of toner consumed by the image former 40 as the state of the image former 40.

Therefore, it is possible to appropriately form the image quality adjustment patch based on the amount of toner consumed by the image former 40.

In the image processing apparatus according to the present embodiment, the predetermined image is a first image quality adjustment patch, and the replacer replaces the first image quality adjustment patch with a second image quality adjustment patch.

The first image quality adjustment patch is the gradation correction patch P1, and the second image quality adjustment patch is the coverage rate correction patch P2.

Therefore, even if the output product has a low coverage rate, it is possible to prevent toner from accumulating in the image former 40 by consuming old toner with the coverage rate correction patch P2.

In the image processing apparatus according to the present embodiment, the first image quality adjustment patch is the coverage rate correction patch P2, and the second image quality adjustment patch is the gradation correction patch P1.

Therefore, when gradation correction is required, by performing the gradation correction based on the gradation correction patch P1, it is possible to prevent image changes during output of the print job and accordingly stabilize colors.

In the image processing apparatus according to the present embodiment, the predetermined image is an image based on print data.

Therefore, even when replacement by other image quality adjustment patches is not possible, it is possible to replace the job image A with the image quality adjustment patch. As a result, it is possible to obtain an output product with high image quality adjustment accuracy.

In the image processing apparatus according to the present embodiment, the replacer replaces an image with a predetermined attribute included in the image based on the print data with the image quality adjustment patch.

Therefore, since the image having a predetermined attribute in the job image A can be replaced with the image quality adjustment patch, it is possible to obtain an output product with high image quality adjustment accuracy.

In the image processing apparatus according to the present embodiment, the replacer replaces a range set in advance in the image based on the print data with the image quality adjustment patch.

Therefore, since a predetermined range in the job image A can be replaced with the image quality adjustment patch, it is possible to obtain an output product with high image quality adjustment accuracy.

The image processing apparatus according to the present embodiment includes a receiver (controller 5a) that receives a permission instruction to permit the execution of replacement processing before image formation.

Therefore, it is possible to execute the replacement processing based on the user's instruction.

The image processing apparatus according to the present embodiment includes a first determiner (controller 5a) that determines whether or not to execute replacement processing during image formation.

Therefore, since it is possible to determine whether or not to execute the replacement processing based on the image quality state of the output product during image formation or the state of the image former, it is possible to form a more appropriate image quality adjustment patch.

The image processing apparatus according to the present embodiment includes a second determiner (controller 5a) that determines whether or not gradation correction is required based on the result of reading the image quality adjustment patch formed on the output product during image formation. When the second determiner determines that gradation correction is required, the replacer replaces the image based on the print data or the coverage rate correction patch P2 with the gradation correction patch P1.

Therefore, since the gradation correction patch P1 can be formed when gradation correction is required, it is possible to correct the gradation with higher accuracy.

The image processing apparatus according to the present embodiment includes a first calculator (controller 5a) that calculates the first toner consumption amount, which is the amount of toner currently consumed by the image former 40 in the print job, during image formation. When the first toner consumption amount is less than the predetermined first threshold value, the replacer replaces the image based on the print data or the gradation correction patch P1 with the coverage rate correction patch P2.

Therefore, even when toner deterioration occurs, the coverage rate correction patch P2 can be formed. As a result, it is possible to eliminate the toner deterioration.

The image processing apparatus according to the present embodiment includes a third determiner (controller 5a) that determines whether or not to execute replacement processing before image formation. Therefore, since the replacement processing can be executed before image formation, it is possible to form a more appropriate image quality adjustment patch during image formation.

The image processing apparatus according to the present embodiment includes a second calculator (controller 5a) that calculates the second toner consumption amount, which is the amount of toner consumed by the image former 40 for each page of the print image data generated based on the print data, before image formation. The replacer replaces the image based on the print data or the gradation correction patch P1 with the coverage rate correction patch P2 on a page preceding consecutive pages in which the second toner consumption amount is less than the predetermined second threshold value.

Therefore, it is possible to consume toner by forming the coverage rate correction patch P2 before toner deterioration occurs.

In the image processing apparatus according to the present embodiment, the replacer performs replacement by the image quality adjustment patch in descending order of priority set in the predetermined image.

Therefore, it is possible to perform replacement by the image quality adjustment patch in descending order of priority desired by the user.

In the image processing apparatus according to the present embodiment, the order of priority is, in descending order, other types of image quality adjustment patches and the image based on the print data.

Therefore, the other types of image quality adjustment patches can be preferentially replaced.

The image forming system 100 according to the present embodiment includes an image processing apparatus (print controller 5) and the image former 40 that forms an image on a recording medium based on print image data.

Therefore, it is possible to form the image quality adjustment patch more appropriately together with the job image based on the print image data in which a more appropriate image quality adjustment patch based on the image quality state of the output product or the state of the image former 40 is arranged.

In the image forming system 100 according to the present embodiment, the recording medium includes the continuous recording medium PM.

Therefore, even while the job is being printed on the continuous recording medium, it is possible to form the image quality adjustment patch together with the job image.

While the present embodiment of the present invention has been described above, the description in the above embodiment is a preferable example of the image forming system according to the present invention, and the present invention is not limited thereto.

For example, in the above embodiment, image formation is performed on the continuous recording medium PM, which is a continuous medium that can be wound. However, the present invention is not limited thereto. The image forming system 100 may form an image on a sheet of paper or the like, which is not a continuous medium. By applying the present invention to the image forming system that forms an image on a sheet of paper or the like, gradation correction or consumption of old toner during job printing can be performed at the same time as job image printing. As a result, it is possible to prevent the occurrence of wasted paper on which only the image quality adjustment patch is printed.

The controller 10 of the image forming apparatus 2 may have a function as an image processing apparatus.

The detailed configuration and detailed operation of the image forming system can also be appropriately changed without departing from the spirit of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An image processing apparatus, comprising:
   a hardware processor that generates an image based on print data of a print job and print image data for forming an image quality adjustment patch at a predetermined cycle and executes replacement processing for replacing a predetermined image with the image quality adjustment patch based on an image quality state of an output product or a state of an image former.

2. The image processing apparatus according to claim 1, wherein the hardware processor executes the replacement processing based on a result of reading the image quality adjustment patch formed on the output product as the image quality state of the output product.

3. The image processing apparatus according to claim 1, wherein the hardware processor executes the replacement processing based on an amount of toner consumed by the image former as the state of the image former.

4. The image processing apparatus according to claim 1, wherein the predetermined image is a first image quality adjustment patch, and the hardware processor replaces the first image quality adjustment patch with a second image quality adjustment patch.

5. The image processing apparatus according to claim 4, wherein the first image quality adjustment patch is a gradation correction patch, and the second image quality adjustment patch is a coverage rate correction patch.

6. The image processing apparatus according to claim 4, wherein the first image quality adjustment patch is a coverage rate correction patch, and the second image quality adjustment patch is a gradation correction patch.

7. The image processing apparatus according to claim 1, wherein the predetermined image is the image based on the print data.

8. The image processing apparatus according to claim 7, wherein the hardware processor replaces an image having a predetermined attribute included in the image based on the print data with the image quality adjustment patch.

9. The image processing apparatus according to claim 7, wherein the hardware processor replaces a range set in advance in the image based on the print data with the image quality adjustment patch.

10. The image processing apparatus according to claim 1, wherein the hardware processor receives a permission instruction to permit execution of the replacement processing before image formation.

11. The image processing apparatus according to claim 1, wherein the hardware processor determines whether or not to execute the replacement processing during image formation.

12. The image processing apparatus according to claim 2, wherein the hardware processor determines whether or not gradation correction is required based on the result of reading the image quality adjustment patch formed on the output product during image formation, and when it is determined that the gradation correction is required, the hardware processor replaces the image based on the print data or a coverage rate correction patch with a gradation correction patch.

13. The image processing apparatus according to claim 3, wherein the hardware processor calculates a first toner consumption amount, which is an amount of toner currently consumed by the image former in the print job, during image formation, and when the first toner consumption amount is less than a predetermined first threshold value, the hardware processor replaces the image based on the print data or a gradation correction patch with a coverage rate correction patch.

14. The image processing apparatus according to claim 1, wherein the hardware processor determines whether or not to execute the replacement processing before image formation.

15. The image processing apparatus according to claim 14, wherein the hardware processor calculates a second toner consumption amount, which is an amount of toner consumed by the image former for each page of print image data generated based on the print data, before image formation, and the hardware processor replaces the image based on the print data or a gradation correction patch with a coverage rate correction patch on a page preceding consecutive pages in which the second toner consumption amount is less than a predetermined second threshold value.

16. The image processing apparatus according to claim 1, wherein the hardware processor performs replacement by the image quality adjustment patch in descending order of priority set in the predetermined image.

17. The image processing apparatus according to claim 16, wherein the order of priority is, in descending order, other types of image quality adjustment patches and the image based on the print data.

18. An image forming system, comprising:
the image processing apparatus according to claim 1; and
the image former that forms an image on a recording medium based on the print image data.

19. The image forming system according to claim 18, wherein the recording medium includes a continuous recording medium.

20. A non-transitory computer-readable recording medium storing a program causing a computer of an image processing apparatus to perform:
generating an image based on print data of a print job and print image data for forming an image quality adjustment patch at a predetermined cycle; and
executing replacement processing for replacing a predetermined image with the image quality adjustment patch based on an image quality state of an output product or a state of an image former.

\* \* \* \* \*